C. E. GILLESPIE.
JAR-LIFTER.

No. 177,236.

2 Sheets—Sheet 1.

Patented May 9, 1876.

WITNESSES.
Saml. S. Boyd
Albert F. Vallotton

INVENTOR.
Cyrus E. Gillespie
By Chas. D. Moody
atty.

C. E. GILLESPIE.
JAR-LIFTER.

No. 177,236.

2 Sheets—Sheet 2

Patented May 9, 1876.

UNITED STATES PATENT OFFICE.

CYRUS E. GILLESPIE, OF EDWARDSVILLE, ILLINOIS.

IMPROVEMENT IN JAR-LIFTERS.

Specification forming part of Letters Patent No. 177,236, dated May 9, 1876; application filed February 24, 1876.

*To all whom it may concern:*

Be it known that I, CYRUS E. GILLESPIE, a resident of Edwardsville, county of Madison, State of Illinois, have invented a new and useful Improvement in Jar-Lifters, of which the following is a full, clear, and exact description, reference being had to the annexed drawing, making part of this specification in which—

Figure 1:
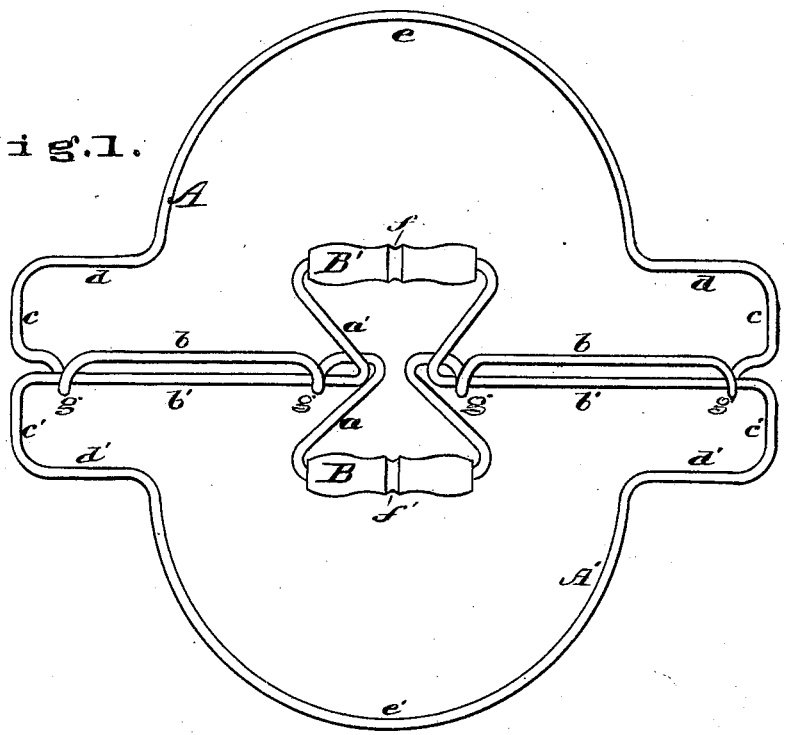
Figure 2:
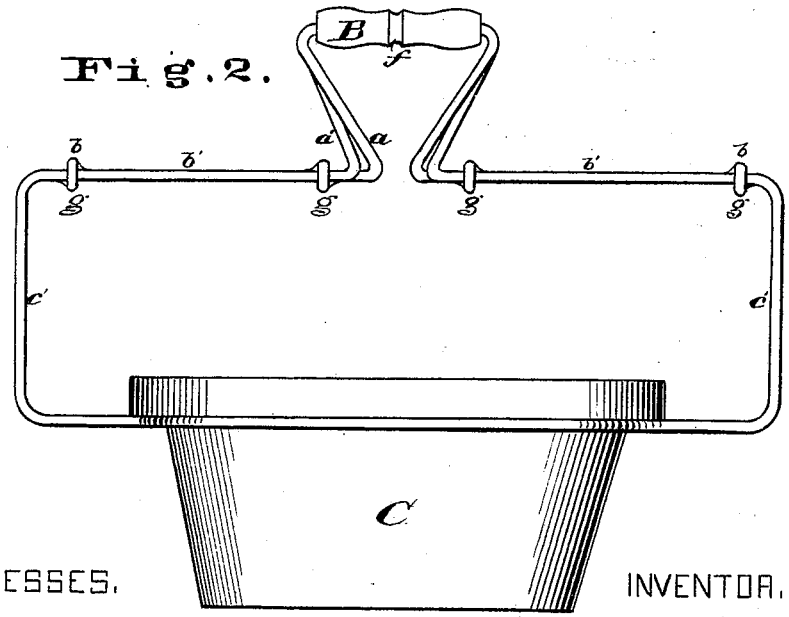
Figure 3:
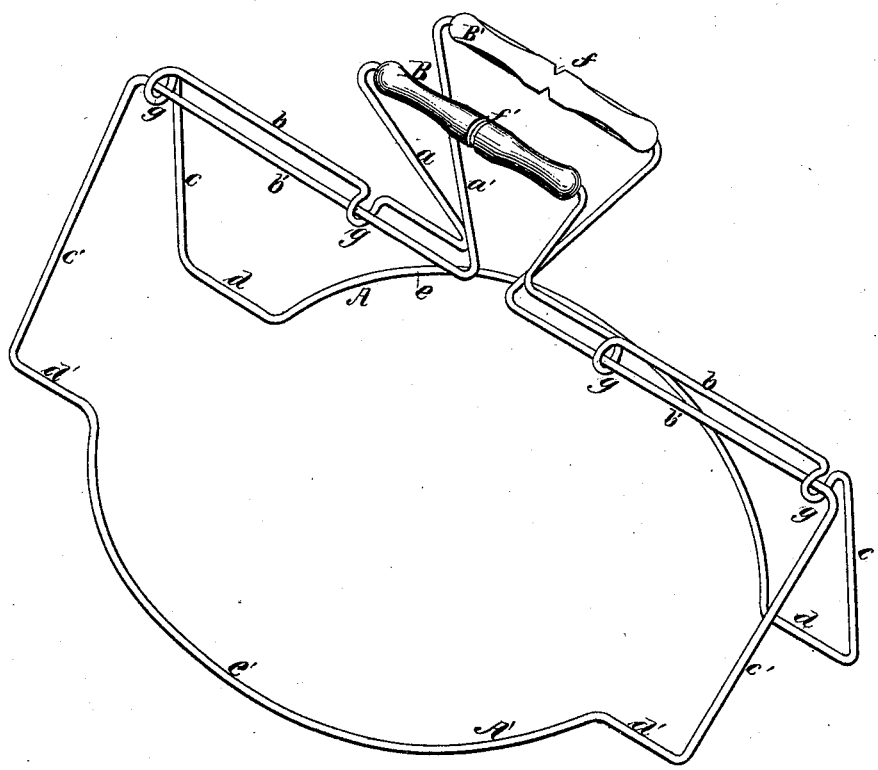

Figure 1 is a plan; Fig. 2, a side elevation, showing it attached to a jar. Fig. 3 is a perspective view of the device.

Like letters indicate like parts.

The aim of the present invention is to provide means for readily lifting and steadily carrying a jar, pot, crock, or any vessel having a large belly and a wide mouth.

Referring to the annexed drawing, A and A' represent the two main parts of the lifter, being pieces of wire bent, respectively, into the peculiar shapes shown in the drawing. As above stated, these shapes are, in the main, similar, and as follows, beginning with the bails $a$ and $a'$, respectively: From the lower part thereof, and to either side, the wire is extended horizontally, forming the bars $b$ $b$ $b'$ $b'$. It is then extended vertically downward, forming the parts $c c c' c'$. It is extended inward and horizontally, forming the parts $d$ $d'$. Each of these last-named parts, however, after passing inward a short distance from either side, is rounded horizontally outward, as shown more distinctly at $e$ $e'$, Fig. 1, and each forming a half-circle, or thereabout. B B' represent handles, attached, respectively, to the bails $a$ and $a'$. Both of them, at their centers, are similarly provided with grooves $f f'$. The two parts A and A' are hinged together at $g$ $g$ $g$ $g$.

I do not desire to be limited to any particular hinge, but prefer the form shown, which is made by doubling and folding the bars $b$ $b$, respectively, around the bars $b'$ $b'$. This enables the hinges to be made from the same pieces of wire of which the parts A A' are formed, and it is also a very durable hinge.

When the parts A A' are put together the arrangement of the bails is as follows: One bail, $a'$, is made to project through and cross the other bail, $a$. To this end the lower part of the bail $a'$ is made enough smaller than the corresponding part of the bail $a$ to enable the former to be passed through the latter. C, Fig. 2, represents a vessel held by the lifter.

In operation, the parts A A' are opened, as indicated in Fig. 1, and sufficiently to allow the device to be passed down over the vessel to be lifted. The handles B B' are then clasped and drawn together, closing the parts $e$ $e'$ around the vessel and grasping it, so that it can be easily lifted.

The invention, while capable of being used in connection with jars of various shapes, is especially useful in carrying vessels, like crocks, filled with milk, whose contents it is undesirable to agitate during the carrying; for it will be seen in this way of lifting that the center of gravity of the vessel is directly beneath the point of suspension, and the vessel is, therefore, in the best position to be carried steadily.

The handles B B' are preferably flattened on their inner sides to enable them to be more easily grasped.

By means of the grooves $f f$ any suitable instrument for weighing can be properly hooked to the handle.

I am aware that plate-lifters have been constructed with straight hooked jaws, which fall, by gravity, underneath the rim of the plate, and that they also have been made with straight jaws, which can be closed by clasping the handle, but which are so arranged that the plate, when lifted, is not beneath the point of suspension.

Having described my invention, what I claim is—

The herein-described lifter A A', consisting of the bails $a$ $a'$, bars $b$ $b$ $b'$ $b'$, parts $c$ $c$ $c'$ $c'$, parts $d$ $d$ $d'$ $d'$, parts $e$ $e$ $e'$ $e'$, hinges $g$ $g$, &c., and handles B B', combined and operating substantially as and for the purpose described.

CYRUS E. GILLESPIE.

Witnesses:
JOSEPH GILLESPIE,
ANDRO BACHNING.